United States Patent [19]

Inoue et al.

[11] 4,024,556
[45] May 17, 1977

[54] SIGNALING ARRANGEMENT FOR AN ELECTRICAL SHUTTER

[75] Inventors: Nobuyoshi Inoue; Munetaka Shimizu, both of Kawagoe, Japan

[73] Assignee: Copal Company Limited, Tokyo, Japan

[22] Filed: Sept. 15, 1975

[21] Appl. No.: 613,562

[30] Foreign Application Priority Data

Sept. 17, 1974 Japan ............... 49-110838[U]

[52] U.S. Cl. ........................... 354/266; 354/235
[51] Int. Cl.² ..................................... G03B 17/38
[58] Field of Search .......... 354/266, 226, 234, 235, 354/242, 246, 250, 251

[56] References Cited

UNITED STATES PATENTS

| | | | |
|---|---|---|---|
| 3,925,799 | 12/1975 | Nokatani | 354/266 X |
| 3,927,416 | 12/1975 | Inoue | 354/266 X |

Primary Examiner—John Gonzales
Attorney, Agent, or Firm—Cushman, Darby & Cushman

[57] ABSTRACT

An electric shutter comprising a front blade actuating lever, a signaling lever engageable with said front blade actuating lever and a rear blade actuating lever capable of releasing said signaling lever so that the signaling lever may rotate fully in a predetermined range only at the time of such state that the rear blade actuating lever begins to move prior to the front blade actuating lever by the shutter release and the photographer may be informed by the rotation of the signaling lever of the fact that the exposing operation of the shutter is not being properly made.

2 Claims, 3 Drawing Figures

SIGNALING ARRANGEMENT FOR AN ELECTRICAL SHUTTER

BACKGROUND OF THE INVENTION a. FIELD OF THE INVENTION

The present invention relates to electric shutters and more particularly to a signaling device made to be able to inform the photographer of the fact that an electromagnet for controlling the closing time of the shutter does not work properly due to the drop of the voltage of a current source battery to be below a predetermined value or the failure of an exposure controlling circuit in the case of such fact.

b. DESCRIPTION OF THE PRIOR ART

There is a type of electric shutter wherein an operation of closing a current source switch to energize an electromagnet, an operation of making an amature lever to release a rear blade actuating lever seperable from the electromagnet and an operation of releasing a front blade actuating lever are made to be carried out in turn by the operation of releasing a camera shutter. In such type of electric shutter, when the voltage of the current source battery is on a level above a predetermined value, whenever a photograph is taken, the order of the above mentioned operations will be carried out rightly an a proper exposure will be made but, in such case that the voltage of the current source battery drops to be so lower than a predetermined value that the electromagnet can no longer generate a predetermined magnetic force or that the exposure controlling circuit fails to energize the electromagnet, in the mechanism, the rear blade actuating lever will be released prior to the front blade actuating lever and, as a result, no exposure will be made. Therefore, it is necessary to inform the photographer of such fact when it occurs.

SUMMARY OF THE INVENTION

A primary object of the present invention is to provide an electric shutter of the above mentioned type provided with such signaling device as will be able to inform the photographer of the fact that the magnetic force generate in the electromagnet when the shutter is released is so lower than a predetermined value that the rear blade actuating lever is released prior to the front blade actuating lever in case such fact occurs.

This and other objects of the present invention will become more apparent during the couse of the following detailed description and appended claims.

DESCRIPTION OF THE PREFERRED EMBODIMENT

Figure 1:
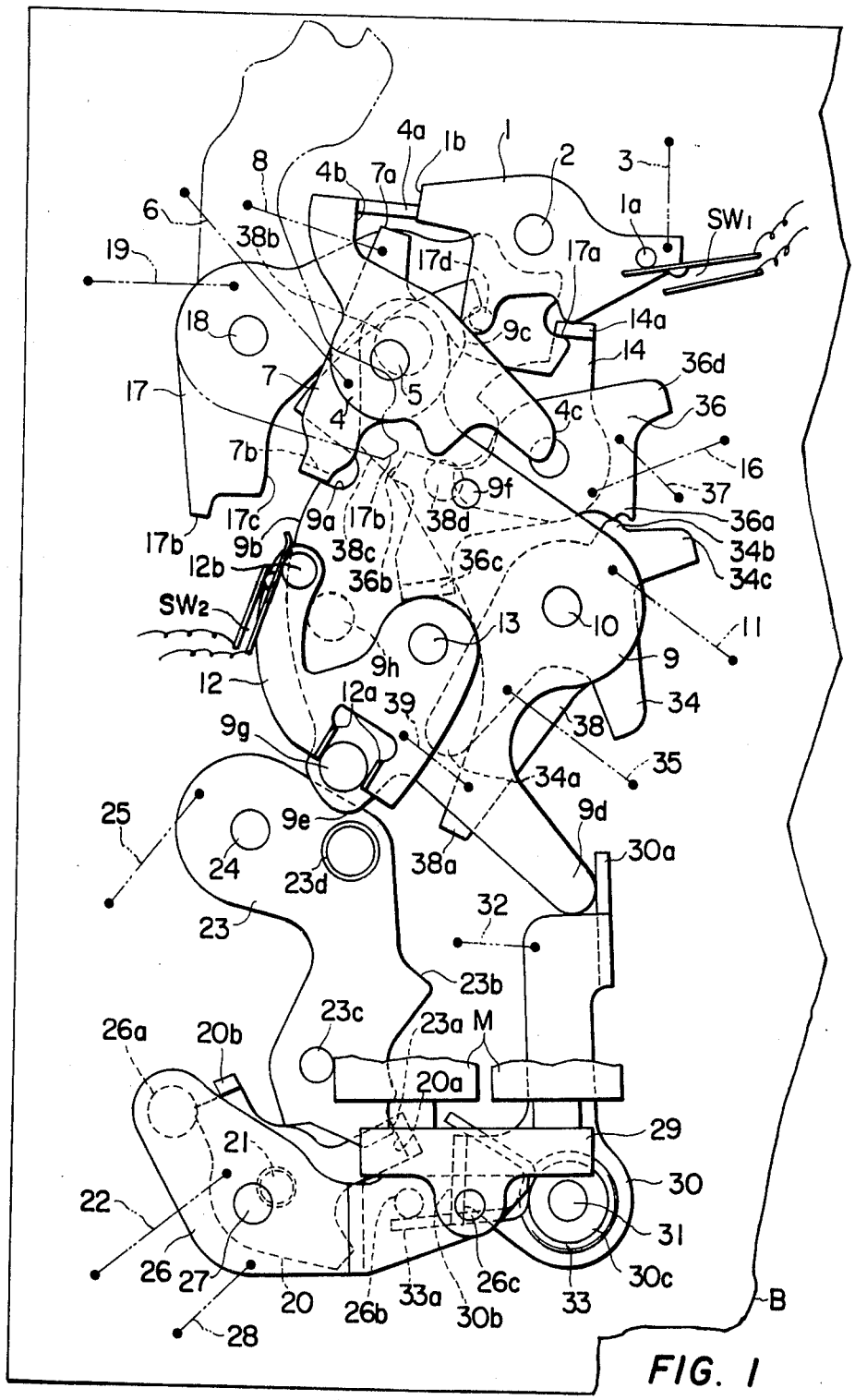
FIG. 1 is a plan view of an embodiment of an opening and closing mechanism of an electric shutter according to the present invention in a cocked state.

With reference to FIG. 1, reference numeral 1 signifies a first releasing lever rotably lever rotatably mounted on a shaft 2 fixed on a base plate B, biased counterclockwise by a spring 3 and having a pin 1a and an end surface 1b. Numeral 4 signifies a second releasing lever rotatably mounted on a shaft 5 fixed on the base plate B, biased clockwise by a spring 6 and forming a bent portion 4a engageable with the end surface 1b of the first releasing lever, a side surface 4b and an arm 4c. Numeral 7 signifies a shutter releasing lever rotatably mounted on the shaft 5, biased counterclockwise by a spring 8 and forming a bent portion 7a engageable with said side surface 4b and another bent portion 7b. Numeral 9 signifies a controlling lever rotatably mounted on a shaft 10 fixed on the base plate B, biased clockwise by a spring 11, forming a hook 9a engageable with the bent portion 7b of the shutter releasing lever 7, an arcuate side surface 9b, a side surface 9c, an arm 9d and a cam surface 9e and having a pin 9f engageable with the arm 4c of the above mentioned second releasing lever 4 and other pins 9g and 9h. Numeral 12 signifies a switch controlling lever rotatably mounted on a shaft 13 fixed on a member (not illustrated) integral with the base plate B, forming a bent portion 12a holding a pin 9g of the controlling lever 9 and having a switch operating pin 12b. Numeral 14 signifies a front blade locking lever rotatably mounted on a shaft 15 fixed on the base plate B, biased counterclockwise by a spring 16 and forming a bent portion 14a engageable with the surface 9c of the controlling lever 9. Numeral 17 signifies a front blade actuating lever rotatably mounted on a shaft 18 fixed on the base plate B, biased counterclockwise by a spring 19, forming a hook 17a engageable with the bent portion 14a of the lever 14, an end surface 17b and a cam surface 17c and having a pin 17d. Numeral 20 signifies a rear blade locking lever rotatably mounted on a shaft 21 fixed on the base plate B, biased counterclockwise by a spring 22 and forming a bent portion 20a and stepped bent portion 20b. Numeral 23 signifies a rear blade actuating lever rotatably mounted on a shaft 24 fixed on the base plate B, biased counterclockwise by a spring 25, forming a hook 23a engageable with the bent portion 20a of the lever 20 and an end surface 23b, having a pin 23c and provided with a roller 23d which can contact the cam surface 9e of the controlling lever 9. Numeral 26 signifies an armature lever rotatably mounted on a shaft 27 fixed on a member (not illustrated) integral with the base plate B, biased clockwise by a spring 28, having a pin 26a engaged with the stepped bent portion 20b of the rear blade locking lever 20 and another pin 26b and provided with a supporting shaft 26c. Numeral 29 signifies an armature rotatably mounted on the supporting shaft 26c and provided as opposed to an electromagnet (shown partly in FIG. 1) fixed on the base plate B. Numeral 30 signifies a holding lever rotatably mounted on a shaft 31 fixed on the base plate B, biased counterclockwise by a weak spring 32, forming a bent portion 30a engaged with the arm 9d of the controlling lever 9 and another stepped bent portion 30b and provided with a barrel portion 30c. Numeral 33 signifies a holding spring wound on the barrel portion 30c so as to hold the stepped bent portion 30b of the holding lever 30 and engaged at one end of the extension with the pin 26b of the above mentioned armature lever 26. Numeral 34 signifies an interlocking lever rotatably mounted on the shaft 10 and biased counterclockwise by a spring 35 and forming an arm 34a engageable with the end surface 23b of the rear blade actuating lever 23 and a projecting surface 34b. Numeral 36 signifies a signaling lever rotatably mounted on a shaft 15, biased clockwise by a spring 37 and forming a hook 36a engageable with the projected surface 34b of the interlocking lever 34, a projected end surface 36b engageable with the end surface 17b of the front blade actuating lever 17, a bent portion 36c and a signaling arm 36d. Numeral 38 signifies a cocking lever rotatably mounted on the shaft 10, biased clockwise by a spring 39, forming an arm 38a, provided with a roller 38b contactable with the cam surface 17c of the front blade actuating lever 17, further forming a surface 38c engageable with the pin 9h of the controlling lever 9 and having a pin 38d engageable with the bent portion 36c of the signaling lever 36.

The front blade actuating lever 17 and rear blade actuating lever 23 are integrally connected respectively, for example, with a front blade supporting arm and rear blade supporting arm not illustrated. Their particular and concrete structures will be more clearly understood by referring to U.S. patent application Ser. No. 501617.

Figure 2:
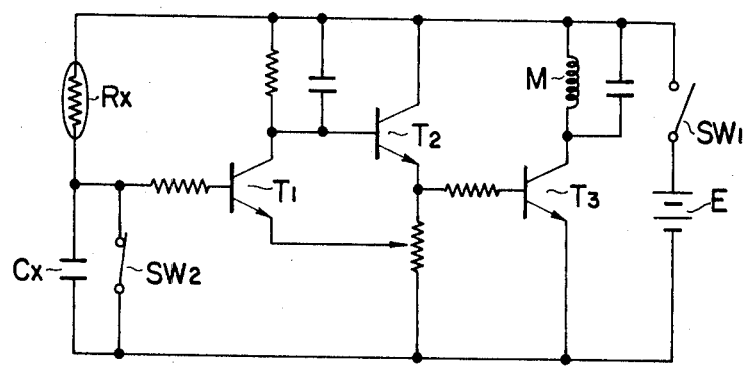
FIG. 2 is a wiring diagram showing a basic type of an exposure controlling circuit used in the electric shutter shown in FIG. 1.

In FIG. 2 showing a basic type of an exposure controlling circuit used together with the shutter blade opening and closing mechanism explained with reference to FIG. 1, reference symbol Rx signifies a photoconductive element which can receive light from an object to be photographed, symbol Cx signifies a capacitor, symbols $T_1$, $T_2$ and $T_3$ signify transistors, symbol E signifies a current source battery, symbol $SW_1$ signifies a normally opened current source switch which will be closed by the pin 1a when the first releasing lever is rotated clockwise from the position in FIG. 1, symbol $SW_2$ signifies a starting switch which will be opened by the pin 12b when the switch controlling lever 12 is rotated clockwise from the position in FIG. 1. The electromagnet M is connected with a collector of the transistor $T_3$. Therefore, according to this exposure time controlling circuit, simultaneously with the closing of the current source switch $SW_1$, the electromagnet M will be energized and, after the starting switch $SW_2$ is opened, when the voltage between the terminals of the capacitor Cx charged with an electric current flowing through the photoconductive element Rx reaches a predetermined level and the transistors $T_1$ and $T_3$ are turned to be cut off, the electromagnet M will be deenergized.

The operation of the above mentioned device shall be explained in the following.

First of all, there shall be explained the case that the voltage of the current source battery E is above a predetermined value so that, when the current source switch $SW_1$ is closed, the electromagnet M may positively attract and hold the armature 29.

In the cocked state in FIG. 1, when the first releasing lever 1 is rotated clockwise against the tension of the spring 3 by the releasing operation of the camera, the current source switch $SW_1$ will be closed, the transistors $T_1$ and $T_3$ will be turned on and the electromagnet M will be energized. By this motion of the first releasing lever 1, the end surface 1b will be disengaged from the bent portion 4a and therefore the second releasing lever 4 will be rotated clockwise by the tension of the spring 6. By this clockwise rotation, the side surface 4b will push the bent portion 7a to clockwise rotate the shutter releasing lever 7 against the tension of the spring 8 and to disengage the bent portion 7b from the hook 9a of the controlling lever 9.

The disengaged controlling lever 9 will be rotated clockwise by the tension of the spring 11. By this clockwise rotation of the controlling lever 9, first the switch controlling lever 12 will be rotated clockwise together with the controlling lever 9 and, by the switch operating pin 12, the starting switch $SW_2$ will be opened and the counting of the exposure time will be thereby started. On the other hand, by the displacement of the arm 9d accompanying the clockwise rotation of the controlling lever 9, the holding lever 30 will be rotated counterclockwise by the tension of the spring 32 so that the bent portion 30a may follow. Therefore, the holding spring 33 will be displaced integrally with the holding lever 30 while holding the stepped bent portion 30b and the pressing of the armature lever 26 against the pin 26b with one end 33a will be released. As a result, the armature lever 26 will be able to be rotated counterclockwise by the tension of the spring 28 but the armature 29 will remain attracted and held by the energized electromagnet M as illustrated.

Further, from a predetermined point of the clockwise rotation of the controlling lever 9, the side surface 9c will push the bent portion 14a, the front blade locking lever 14 will be rotated clockwise against the tension of the spring 16 and the bent portion 14a will be disengaged from the hook 17a of the front blade actuating lever 17. Therefore, the front blade actuating lever 17 will be rotated counterclockwise to the position of the chain line in FIG. 1 by the tension of the spring 19, the front blade not illustrated will be opened and the end surface 17b will come into the motion range of the projected end surface 36b of the signaling lever 36. The second releasing lever 4 will be rotated counterclockwise against the tension of the spring 6 when the arm 4c is pushed by the pin 9f and will be returned to a position rotated somewhat counterclockwise from the state in FIG. 1.

After a predetermined time, when the transistors $T_1$ and $T_3$ are turned off and the electromagnet M is de-energized, the armature lever 26 will be rotated clockwise by the tension of the spring 28, the stepped bent portion 20b will be pushed by the pin 26a, then the rear blade locking lever 20 will be rotated clockwise against the tension of the spring 22 and the bent portion 20a will be disengaged from the hook 23a of the rear blade actuating lever 23. Therefore, the rear blade actuating lever 23 will be rotated counterclockwise by the tension of the spring 25 and the rear blade not illustrated will be closed.

The interlocking lever 34 will be rotated clockwise against the tension of the spring 35 when the arm 34a is pushed by the end surface 23b in the final stroke of the counterclockwise rotation of the rear blade actuating lever 23 and, by this clockwise rotation of the interlocking lever 34, the first releasing lever 1 will be returned to the illustrated state by the arm 34c through such additional device as a mirror mechanism not illustrated. Further, by the counterclockwise rotation of the interlocking lever 34, the projected surface 34b will be disengaged from the hook 36a. Therefore, the signaling lever 36 will be rotated clockwise by the tension of the spring 37 but, as soon as the projected surface 36b contacts the end surface 17b of the front blade actuating lever 17, the clockwise rotation will be stopped. Therefore, in such case, the signaling lever 36 will not be substantially displaced.

There shall be explained in the following the case that, due to the drop of the voltage of the current source battery E to be below a predetermined value or the failure of the circuit, even if the current source switch $SW_1$ is closed, the electromagnet M will not be energized fully or at all and the armature 29 will not be able to be attracted and held.

In such case, as described above, in the clockwise rotation of the controlling lever 9, before the front blade locking lever 14 is disengaged from the front blade actuating lever 17, the pressing of the pin 26b by one end 33a will be released by the displacement of the holding spring 33 accompanying the counterclockwise rotation of the holding lever 30, therefore the armature lever 26 will be soon rotated clockwise by the tension of the spring 28 and the rear blade locking lever 20 will be disengaged from the rear blade actuating lever 23. Therefore, the rear blade actuating lever 23 will be rotated counterclockwise prior to the front blade actuating lever 17.

As a result, as the end surface 17b of the front blade actuating lever 17 has not yet come into the motion range of the projected end surface 36b, the signaling lever 36 will be well clockwise rotated by the tension of the spring 37.

Then, the front blade actuating lever 17 will be also disengaged and counterclockwise rotated as described above.

Figure 3:
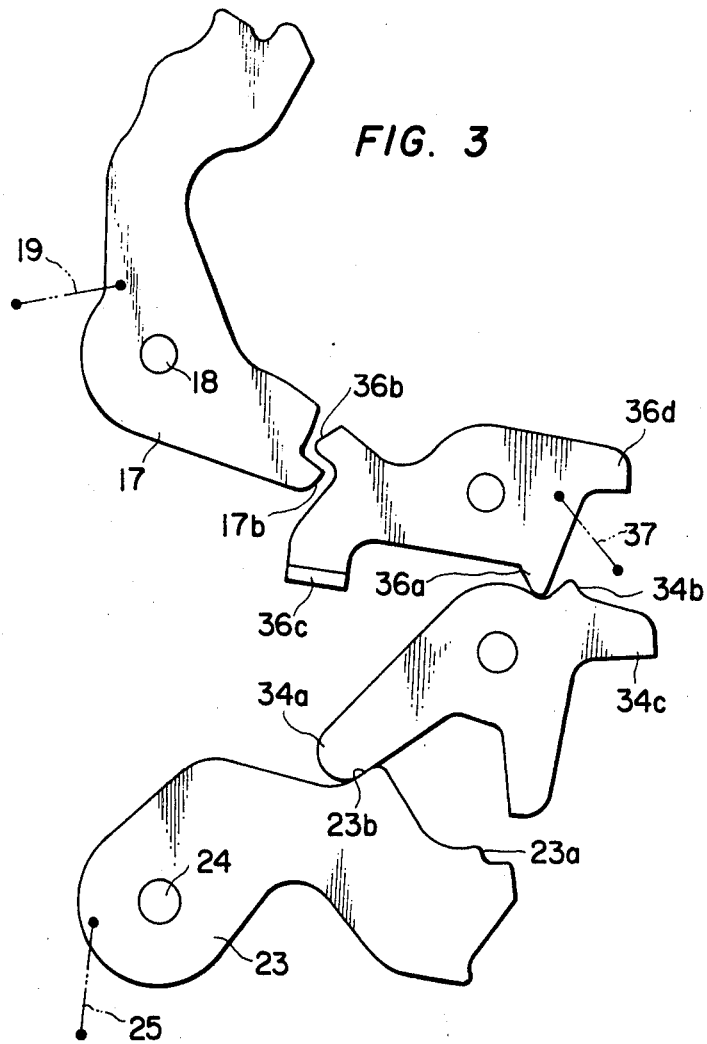
FIG. 3 is a plan view of an essential part in case the rear blade actuating lever is released prior to the front blade actuating lever.

The relation of the front blade actuating lever 17, rear blade actuating lever 23, interlocking lever 34 and signaling lever 36 after this operation will be as shown in FIG. 3.

By the motion of the arm 36d accompanying the sufficient clockwise rotation of the signaling lever 36, for example, a flag is made to appear in the view finder to indicate that the photographing operation now has not been proper due to some trouble.

By the way, in this operation, as the rear blade actuating lever 23 operates prior to the front blade actuating lever 17, the rear blade will be closed before the front blade is opened. Accordingly, the film will not be exposed. Therefore, by utilizing the sufficient clockwise rotation of the signaling lever 36, the film winding mechanism can be temporarily disengaged so that the film winding accompanying the later described shutter cocking operation may be idle.

The shutter mechanism cocking operation shall be explained in the following.

When the winding lever of the camera not illustrated is operated, the cocking lever 38 will be rotated counterclockwise against the tension of the spring 39. By this counterclockwise rotation, first the cam surface 17c will be pushed by the roller 38b, the front blade actuating lever 17 will be rotated clockwise against the tension of the spring 19, the front blade not illustrated will be closed and finally the hook 17a will be engaged with the bent portion 14a of the front blade locking lever 14. On the other hand, a little later, the bent portion 36c will be pushed by the pin 38d, the signaling lever 36 will be rotated counterclockwise against the tension of the spring 37, the pin 9h will be pushed by the surface 38c, the controlling lever 9 will be rotated counterclockwise against the tension of the spring 11 and hook 9a will be engaged with the bent portion 7b of the shutter releasing lever 7.

By the counterclockwise rotation of the controlling lever 9, first the side surface 9c will retreat from the bent portion 14a to make the front blade locking lever 14 rotatably counterclockwise so that the above described front blade actuating lever 17 may be positively engaged with the bent portion 14a of the front blade locking lever 14. Further, the rear blade actuating lever 23 will be rotated clockwise against the tension of the spring 25 when the roller 23d is pushed by the cam surface 9e and the hook 23a will be engaged with the bent portion 20a of the rear blade locking lever 20.

On the other hand, by the counterclockwise rotation of the controlling lever 9, the holding lever 30 will be rotated clockwise against the tension of the spring 32 when the bent portion 30a is pushed by the arm 9d. Therefore, the armature lever 26 will be rotated counterclockwise against the tension of the spring 28 when the pin 26b is pushed by one end 33a of the holding spring 33 displaced integrally with the holding lever 30 and the armature 29 will be pressed into contact with the electromagnet M. By the way, the armature lever 26 will have been rotated counterclockwise earlier than the engaging time of the above described rear blade actuating lever 23. Then the pin 26a will have retreated from the bent portion 20b to make the rear blade locking lever 20 counterclockwise rotatable and positively engageable.

The second releasing lever 4 will rotate clockwise until the bent portion 4a is stopped by the end surface 1b of the first releasing lever 1 by the tension of the spring 6 when the pin 9f is displaced accompanying the counterclockwise rotation of the controlling lever 9.

Further, the interlocking lever 34 will be released by the clockwise rotation of the rear blade actuating lever 23 from the pressing with the arm 34a by the end surface 23b and will be rotated counterclockwise by the tension of the spring 35 so that the projected surface 34b may engage with the hook 36a of the signaling lever 36.

After the above cocking operation is made, when the operation is released and the winding lever of the camera returns, the cocking lever 38 will be released from the pressing with the arm 38a and will be rotated clockwise and returned by the tension of the spring 39.

Thus all the members will be in the cocked state in FIG. 1.

By the way, the present invention is not limited to the embodiment itself. That is to say, the front blade locking lever 14 and front blade actuating lever 17 can be considered as shutter blade opening system members and the armature lever 26, rear blade locking lever 20, rear blade actuating lever 23 and interlocking lever 34 can be considered as shutter blade closing system members. Therefore, the signaling lever 36 can be properly arranged between both members.

We claim:

1. A shutter mechanism comprising a base plate, a front blade actuating member rotatably supported on said base plate, a rear blade actuating member rotatably supported on said base plate, an interlocking lever rotatably supported on said base plate and engageable with said rear blade actuating member, a signaling lever rotatably supported on said base plate and engageable with said front blade actuating member and interlocking lever, and a spring connected between said base plate and signaling lever to bias said signaling lever in one direction, said signaling lever being directly prevented from its motion by said front blade actuating member when said front blade actuating member is started prior to said rear blade actuating member by the shutter releasing operation and being moved to a predetermined position to indicate an improper shutter operation without being prevented by said front blade actuating member when said rear blade actuating member is started prior to said front blade actuating member by the shutter releasing operation.

2. A shutter mechanism according to claim 1 wherein said shutter mechanism further comprises a cocking lever rotatably supported on said base plate and engageable with said front blade actuating member, and a controlling lever rotatably supported on said base plate and engageable with said cocking lever and rear blade actuating member, said front blade actuating member and rear blade actuating member being moved simultaneously to their respective cocked positions when said cocking lever is rotated.

* * * * *